United States Patent
Kravitz et al.

(10) Patent No.: US 11,860,699 B2
(45) Date of Patent: Jan. 2, 2024

(54) APPARATUS AND METHOD FOR A MAPPABLE I/O CHANNEL ON AN ELECTRICAL TRANSMITTER

(71) Applicant: MICRO MOTION, INC., Boulder, CO (US)

(72) Inventors: Andrew S. Kravitz, Frederick, CO (US); Tonya L. Wyatt, Arvada, CO (US); Anthony Gentile, Westminster, CO (US)

(73) Assignee: MICRO MOTION, INC., Boulder, CO (US)

(*) Notice: Subject to any disclaimer, the term of this patent is extended or adjusted under 35 U.S.C. 154(b) by 52 days.

(21) Appl. No.: 17/774,698

(22) PCT Filed: Nov. 13, 2019

(86) PCT No.: PCT/US2019/061273
§ 371 (c)(1),
(2) Date: May 5, 2022

(87) PCT Pub. No.: WO2021/096502
PCT Pub. Date: May 20, 2021

(65) Prior Publication Data
US 2022/0397948 A1    Dec. 15, 2022

(51) Int. Cl.
*G06F 1/26* (2006.01)
*H04L 12/10* (2006.01)
(Continued)

(52) U.S. Cl.
CPC ............. *G06F 1/263* (2013.01); *G06F 1/22* (2013.01); *G06F 1/266* (2013.01); *G06F 11/3051* (2013.01); *H04L 12/10* (2013.01)

(58) Field of Classification Search
CPC . G06F 1/189; G06F 1/22; G06F 1/263; G06F 1/266; G06F 1/30; G06F 11/3041;
(Continued)

(56) References Cited

U.S. PATENT DOCUMENTS 5,060,052 A * 10/1991 Casto ................ H01L 23/49572
257/691
2008/0104427 A1* 5/2008 Yee .................... H04L 12/40045
713/300
(Continued)

FOREIGN PATENT DOCUMENTS

EP            1942600 A1     7/2008
JP         2007036832 A      2/2007

*Primary Examiner* — Thomas J. Cleary
(74) *Attorney, Agent, or Firm* — The Ollila Law Group LLC

(57) ABSTRACT

An electrical transmitter (100) is provided that comprises an ethernet connection (118) and a power source. Electronics (112) are configured to receive the ethernet connection (118) and the power source. The electronics (112) comprise logic operable to detect the power source and accept power from either the ethernet connection (118) or a dedicated power connection (116). A remappable power connection terminal (114) with the electronics (112) is operable to accept power when the dedicated power connection (116) is detected, and operable to accept a non-power connection when power from the ethernet connection (118) is detected.

14 Claims, 5 Drawing Sheets

(51) Int. Cl.
*G06F 1/22* (2006.01)
*G06F 11/30* (2006.01)

(58) Field of Classification Search
CPC ... G06F 11/3051; G06F 11/3055; H04L 12/10
See application file for complete search history.

(56) References Cited

U.S. PATENT DOCUMENTS

| | | |
|---|---|---|
| 2009/0003373 A1 | 1/2009 | Morrissey et al. |
| 2009/0073957 A1 | 3/2009 | Newland et al. |
| 2011/0125341 A1* | 5/2011 | Heath ............... H04L 12/10 |
| | | 700/295 |
| 2019/0129485 A1* | 5/2019 | Amano ............. H04L 12/12 |
| 2020/0210354 A1* | 7/2020 | Fayneh ............. G11C 29/025 |
| 2022/0350387 A1* | 11/2022 | Alstad .............. G06F 13/4282 |
| 2023/0087581 A1* | 3/2023 | Peng ................ H04L 12/10 |
| | | 713/340 |

* cited by examiner

APPARATUS AND METHOD FOR A MAPPABLE I/O CHANNEL ON AN ELECTRICAL TRANSMITTER

FIELD OF THE INVENTION

The present invention relates to electrical transmitters, and more particularly, to electrical transmitters having ethernet connections and methods for receiving electrical power thereby.

BACKGROUND

Data networks such as local and wide area networks (LAN/WAN) structures are utilized for data communication between networked devices. Various network elements often include hubs, switches, routers, bridges, printers, data servers, personal computers (PCs), portable PCs, and other peripherals. Devices that connect to the network structure generally must be powered to enable operation. Power of the devices may be supplied by either an internal or an external power supply and is generally powered by connecting to electrical mains.

Some network elements can distribute power over the network in combination with data communications. Power distribution over a network combines power and data communications into a single network connection. This has the advantage of reducing installation costs, reducing the number of required connections, reducing or eliminating alternating current (AC) to direct current (DC) adapters, and reducing or eliminating AC power supplies. Additionally, power distributed over a network such as an Ethernet network may function as an uninterruptible power supply (UPS) to components or devices that normally would be powered using a dedicated UPS.

When developing an industrial ethernet peripheral, a general expectation is that the product will require a main power input, a standard Ethernet connection, as well as additional analog input/output (I/O), depending on the application requirements. The main power and analog I/O inputs are usually installed using traditional industrial connection terminals, while the Ethernet connection will generally utilize a standard ethernet connector such as an RJ-45 connection. Additionally, the analog and power wiring is typically installed with general purpose field wiring, while the Ethernet cable requires a Category Rated Ethernet cable which consists of 8 wires arranged as 4 individual twisted pairs, terminated to an RJ-45, 8P8C header.

Distribution of Power over Ethernet (PoE) network connections is guided by the Institute of Electrical and Electronics Engineers (IEEE) Standard 802.3 and/or other relevant standards. However, such rigid specifications and standards often limit allowable power and the method for power architecture. Currently there are three modes of PoE defined under the IEEE 802.3 standard that support the use of standard Category Rated Ethernet cables: Mode A uses four signal wires for 10BASE-T and 100-BASETX to supply power, Mode B uses the other four conductors in the Ethernet cable, and four-pair mode uses all eight wires to supply power.

When considering a device which supports Mode B or four-pair mode, one must reserve the use of all eight conductors for power and ethernet communication, effectively utilizing all conductors in the Ethernet cable.

One problem with utilizing PoE in a transmitter, however, is that this scheme has not been widely adopted in the consumer or industrial space. There are likely many reasons for this lack of adoption, such as a lack of consistency across standards, the difficulty of implementing such a system, and the potential costs associated with creating a PoE based network compared to a traditional network. As a result, it is likely that many customers are hesitant to adopt PoE into their standard practices.

Another concern that must be considered when developing an Ethernet peripheral, especially in a compact housing, is that implementations are often limited to only two conduits for wire entry into a peripheral. The first conduit is usually reserved for power, as a fault to an I/O line running into the same conduit could damage equipment. The second conduit is then often used for I/O channels. In a typical analog product, this is usually sufficient, as multiple analog wire pairs can be bundled into a single cable bundle, however in an Ethernet product it can be difficult to properly seal a conduit featuring both an analog cable bundle and an Ethernet cable, since Ethernet requires a dedicated 8P8C cable.

A device and method are provided that allows a peripheral to assume a number of different power and I/O schemes that utilize either one or two cable conduits, thus creating installation flexibility and cost savings.

SUMMARY OF THE INVENTION

An electrical transmitter is provided according to an embodiment. The electrical transmitter comprises an ethernet connection and a power source. Electronics are configured to receive the ethernet connection and the power source. The electronics comprise logic operable to detect the power source and accept power from either the ethernet connection or a dedicated power connection. A remappable power connection terminal with the electronics is operable to accept power when the dedicated power connection is detected, and operable to accept a non-power connection when power from the ethernet connection is detected.

A method for operating an electrical transmitter is provided according to an embodiment. The method comprises receiving an ethernet connection, receiving a power source, and providing electronics configured to receive the ethernet connection and the power source. The power source is detected, and power is accepted from either the ethernet connection or a dedicated power connection. A remappable power connection terminal is provided with the electronics, and power is accepted from the power connection terminal when the dedicated power connection is detected. A non-power connection is accepted from the power connection terminal when power from the ethernet connection is detected.

ASPECTS OF THE INVENTION

According to an aspect, an electrical transmitter comprises an ethernet connection and a power source. Electronics are configured to receive the ethernet connection and the power source. The electronics comprise logic operable to detect the power source and accept power from either the ethernet connection or a dedicated power connection. A remappable power connection terminal with the electronics is operable to accept power when the dedicated power connection is detected, and operable to accept a non-power connection when power from the ethernet connection is detected.

Preferably, the non-power connection comprises an analog I/O channel.

Preferably, the electronics comprises logic operable to automatically map the power connection terminal to be the non-power connection when power is detected from the ethernet connection.

Preferably, the electronics is configurable to manually map the power connection terminal to be the non-power connection.

Preferably, the electronics is configurable to manually map the power connection terminal to be the non-power connection with software.

Preferably, the electronics is configurable to manually map the power connection terminal to be the non-power connection with hardware.

Preferably, the electronics is operable to detect an electrical signal at the connection terminal, and compare the electrical signal to a predetermined threshold, and wherein the predetermined threshold must be reached for the electronics to use as the electrical signal at the connection terminal as a sole power source.

According to an aspect, a method for operating an electrical transmitter comprises receiving an ethernet connection, receiving a power source, and providing electronics configured to receive the ethernet connection and the power source. The power source is detected, and power is accepted from either the ethernet connection or a dedicated power connection. A remappable power connection terminal is provided with the electronics, and power is accepted from the power connection terminal when the dedicated power connection is detected. A non-power connection is accepted from the power connection terminal when power from the ethernet connection is detected.

Preferably, the non-power connection comprises an analog I/O channel.

Preferably, the method comprises the step of automatically mapping the power connection terminal to be the non-power connection when power is detected from the ethernet connection.

Preferably, the method comprises the step of a manually mapping the power connection terminal to be the non-power connection.

Preferably, the method comprises the step of a manually mapping the power connection terminal to be the non-power connection with software.

Preferably, the method comprises the step of a manually mapping the power connection terminal to be the non-power connection with hardware.

Preferably, the electronics is operable to detect an electrical signal at the connection terminal, and compare the electrical signal to a predetermined threshold, and wherein the predetermined threshold must be reached for the electronics to use as the electrical signal at the connection terminal as a sole power source.

DETAILED DESCRIPTION

Figure 1:
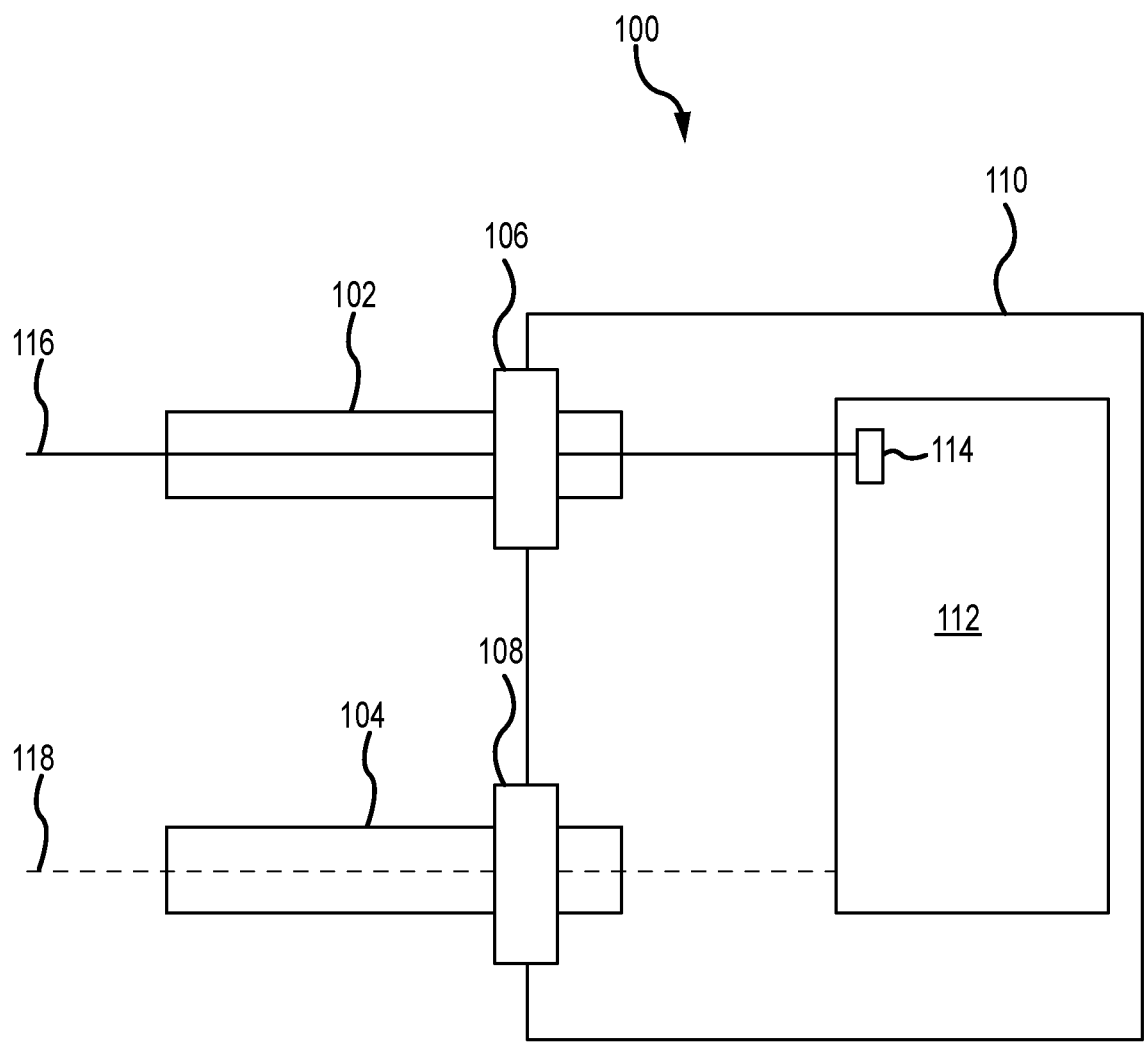
FIG. 1 illustrates a configuration for an electrical transmitter according to an embodiment.

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

When designing an electrical transmitter, it is beneficial to support as many customer installation scenarios as possible to ensure that a product will meet application needs—whether or not PoE is implemented. In the embodiments provided, an electronics transmitter is disclosed that can utilize power delivered by either PoE or a standard power input, such as from electrical mains or other dedicated power supply. This allows the electronics transmitter to flexibly function according to installation preferences and design constraints, rather than forcing a predetermined power supply scheme, and forcing selection of a suitably adapted electrical transmitter accordingly. Thus, the electronics transmitter is designed to accept power from either source depending on which power source is present.

With reference to FIGS. 1-4, embodiments of electrical transmitters 100 with two conduits 102, 104, are contemplated. Each conduit 102, 104 may have an associated pass-through 106, 108. The electrical transmitters 100 comprise an enclosure 110 and electronics 112 therein. The electrical transmitter 100 relates to electronics or computing devices housed and typically coupled with a device that requires electronics or processing capabilities.

Assuming the enclosure 110 is large enough to fit electronics 112 with an ethernet port, analog I/O channel, and power port, five installation types can be met with a single device using automatic mode switching.

A standard power connection 116 may be employed by the electrical transmitter 100. The standard power connection 116 comprises dedicated AC or DC power necessary to operate the electrical transmitter 100 and/or connected devices and peripherals, as will be understood by those skilled in the art.

FIG. 1 illustrates an embodiment (Type I) where a standard power connection 116 (represented by a solid line) and a standard ethernet 118 connection (represented by a dashed line) are utilized. The first conduit 102 may be used for power, and the second conduit 104 may be used for ethernet cabling 118.

Figure 2A:
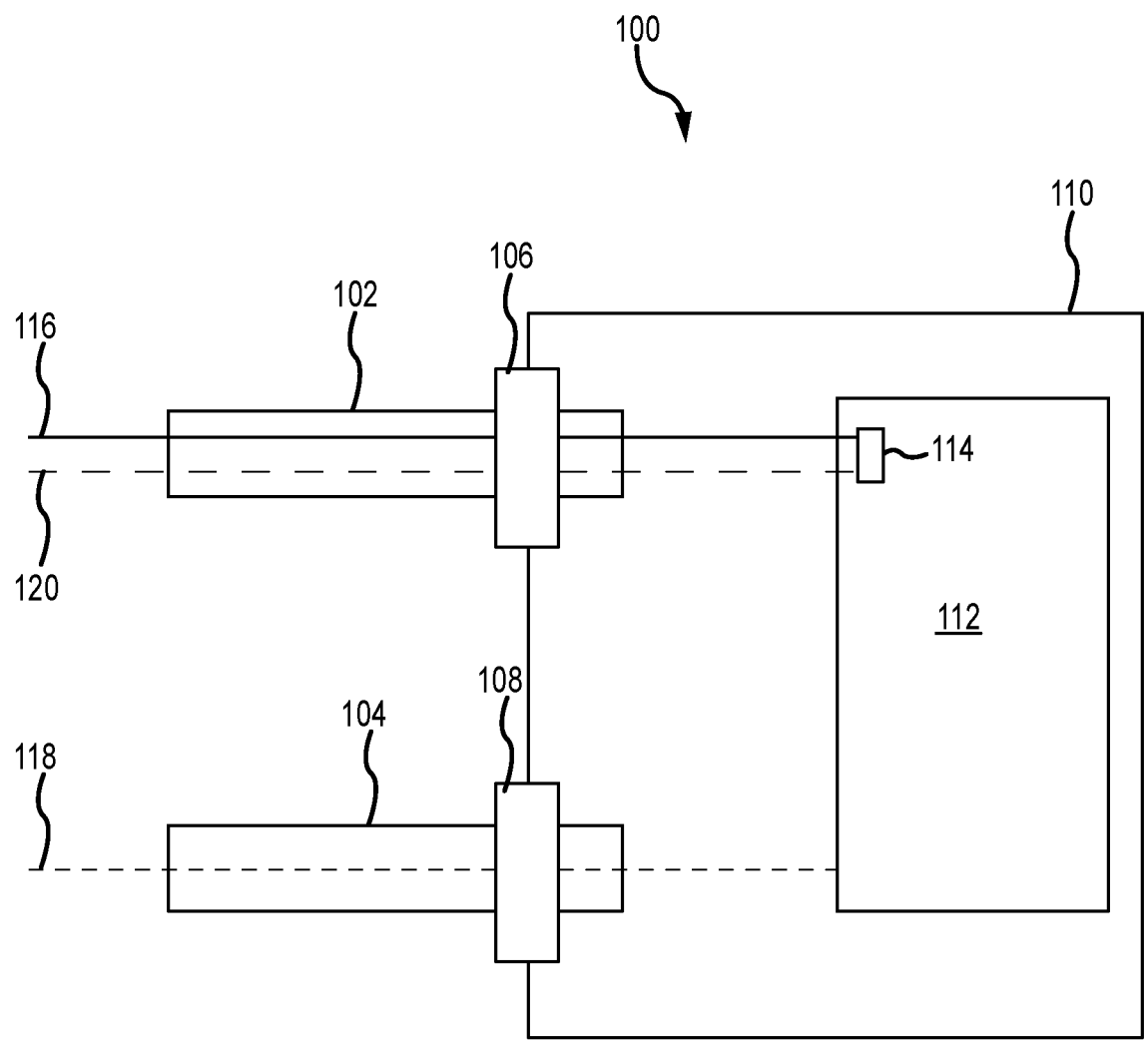
FIG. 2A illustrates a configuration for the electrical transmitter according to an embodiment.
Figure 2B:
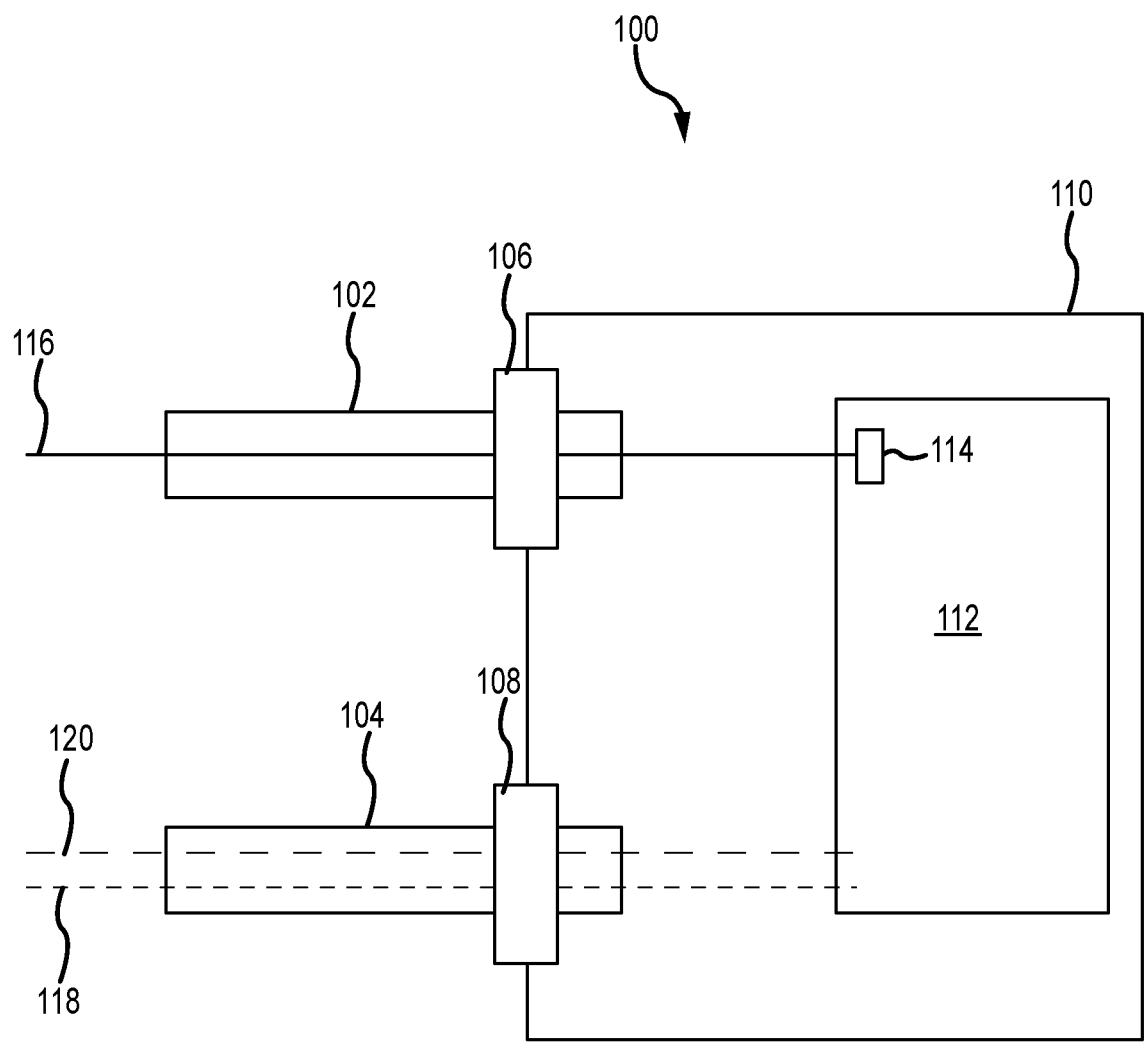
FIG. 2B illustrates a configuration for the electrical transmitter according to an embodiment.

FIGS. 2A and 2B illustrate an embodiment (Type II) where a standard power connection 116 and a standard ethernet 118 connection are utilized. However, in this embodiment, an additional analog I/O connection 120 (represented by a dashed line) is also present. In FIG. 2A, the first conduit 102 is used for the standard power connection 116 and the analog I/O connection 120, while the second conduit 104 may be used for ethernet cabling 118. Alternatively, as illustrated in FIG. 2B, the first conduit 102 is used for the standard power connection 116, and the second conduit 104 may be used for used for ethernet cabling 118 and the analog I/O connection 120.

Figure 3:
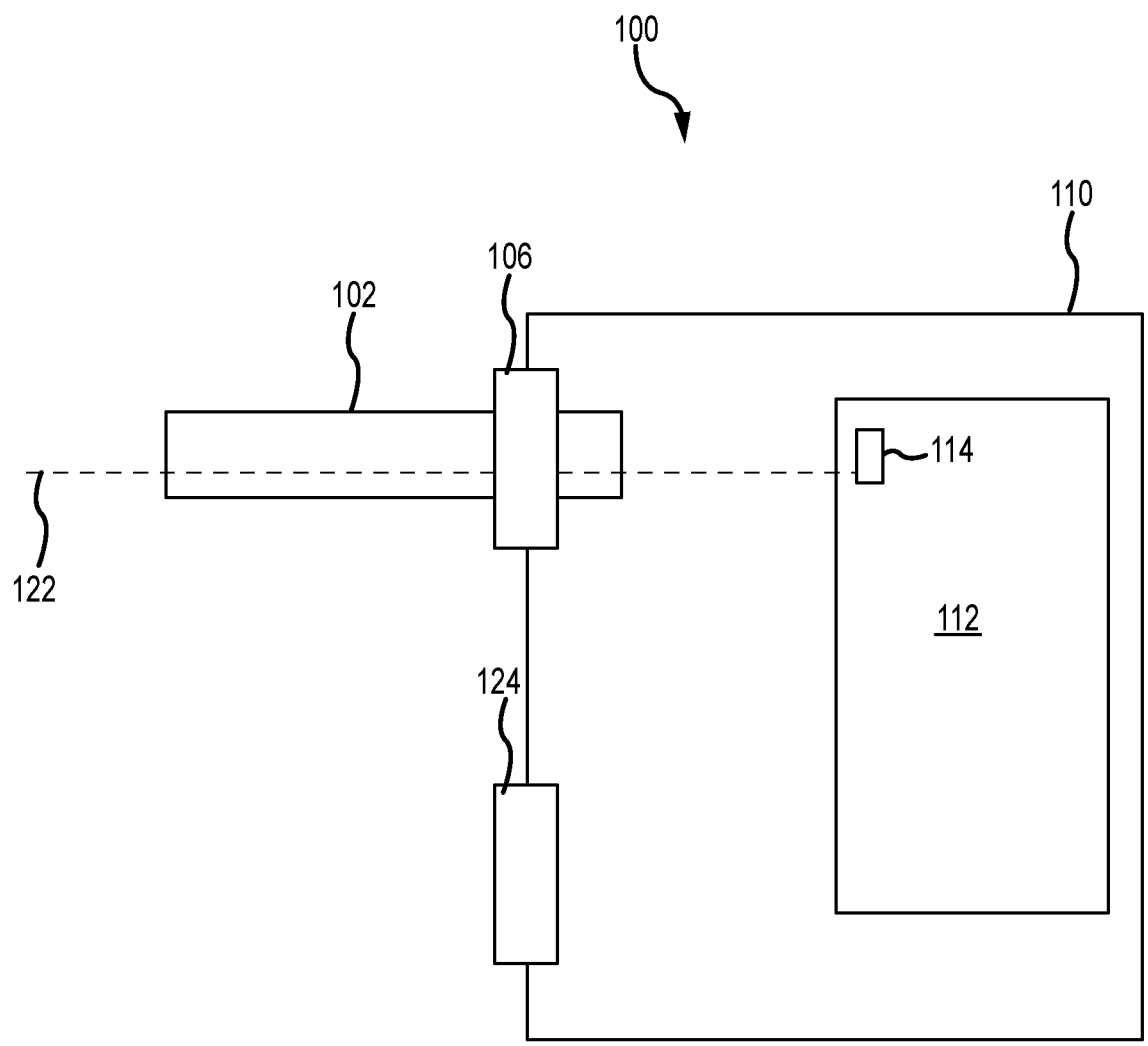
FIG. 3 illustrates a configuration for the electrical transmitter according to an embodiment.

FIG. 3 illustrates an embodiment (Type III) where a PoE connection 122 is utilized with no additional analog I/O. In this case, only one conduit 102 is necessary, as a single ethernet cable provides both power and I/O functionality. A plug 124 may therefore be utilized to seal the enclosure 110.

Figure 4:
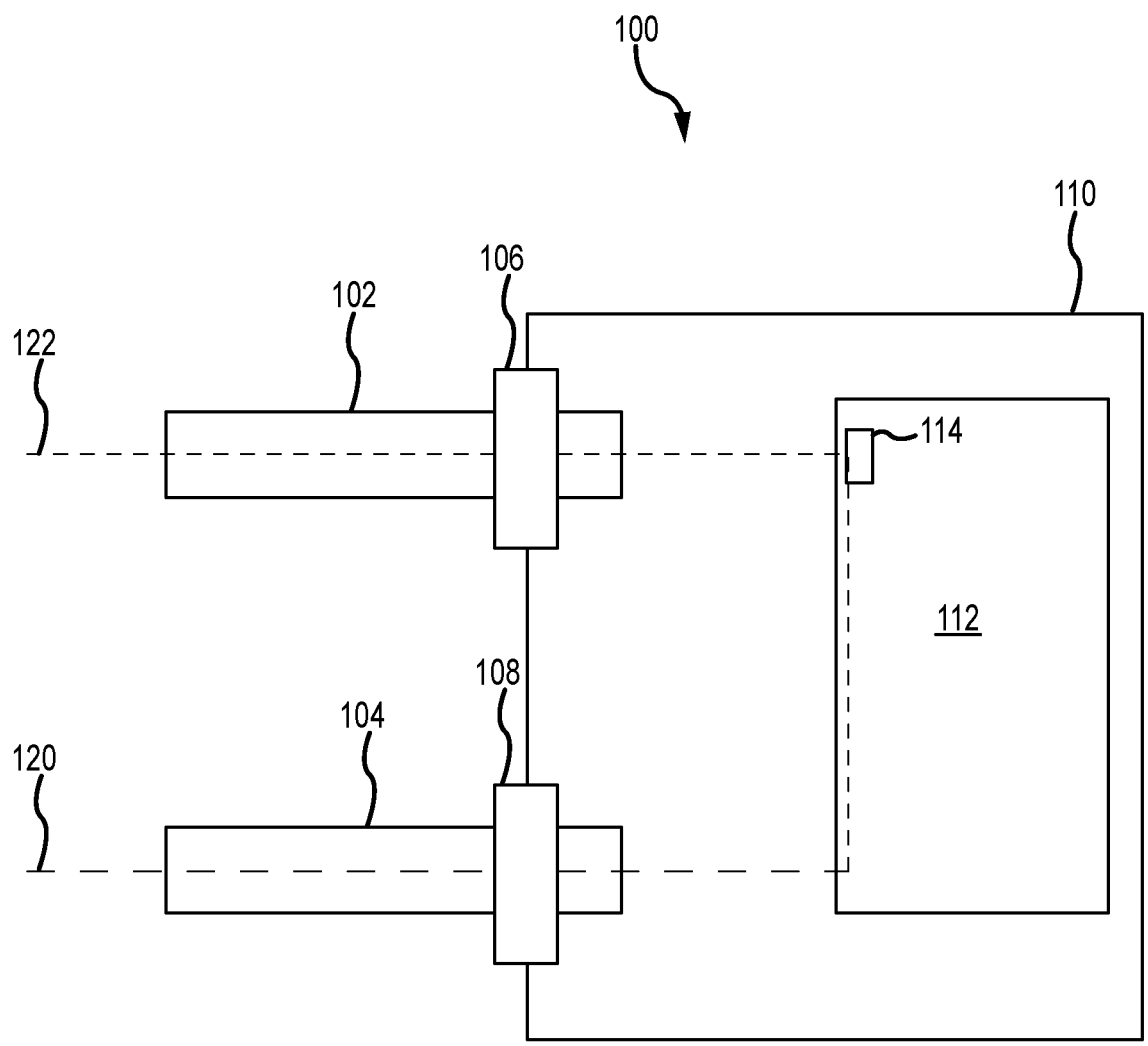
FIG. 4 illustrates a configuration for the electrical transmitter according to an embodiment.

FIG. 4 illustrates an embodiment (Type IV) where a PoE connection 122 is utilized with an additional analog I/O connection 120. The first conduit 102 may be used for an ethernet cable that provides power and I/O functionality power, while the second conduit 104 may be used for the analog I/O connection 120.

It should be noted that a single electrical transmitter 100 may be configurable to perform in any number of the above-disclosed embodiments.

Type III and IV connection schemes (FIGS. 3 and 4) have an added benefit such that the electrical transmitter 100 is set up to use PoE, so an additional connection terminal 114 which is no longer needed becomes available, since the main power input that would have otherwise been connected to the connection terminal will not be required for PoE applications. Instead of leaving this connection terminal 114 unused in this application, it would instead be beneficial to utilize this connection terminal 114 as an analog I/O channel, such as illustrated in FIG. 4. This is especially useful in situations where a compact enclosure 110 is utilized and it is difficult to physically fit additional I/O channels inside the enclosure.

Additionally, if the transmitter 100 were designed with a compact enclosure 110 that cannot physically fit an analog I/O channel due to space constraints, a number of installations are still supported by a single RJ-45 Jack as well as a configurable Power/Analog I/O port. This extremely compact design using only an RJ-45 Jack plus a single port would still be desirable, considering it only loses the ability to support Type II installations.

From a design standpoint, a transmitter which contains a configurable Power or I/O port could be designed to automatically sense if power is present on the ethernet connector causing it to map the additional I/O channel automatically. Mechanisms for automatic power sensing are well known in the art. Alternatively, power and I/O mapping may be manually assigned at the factory through software configuration to ensure that all appropriate approvals considerations are considered. Additionally, hardware switches could be utilized to adjust power and I/O mapping such that altering the power, ethernet, and I/O scheme is end-user adjustable.

In an embodiment, the electrical transmitter 100 is arranged such that power may be applied to both the ethernet connection 118 and to the connection terminal 114. This supplies power for operation of the electrical transmitter 100. In an embodiment, rectifying diodes or the like are employed with both the ethernet connection 118 and to the connection terminal 114 to prevent power exiting the device unintentionally if both ports are wired to receive power simultaneously. Upon boot up, the electrical transmitter 100 senses whether power exists at the connection terminal 114, via the PoE port, or both by reading the voltages before the rectifiers.

If a voltage is detected at the ethernet PoE port and no voltage is detected on the connection terminal 114, the electrical transmitter 100 may then configure itself to utilize the power provided at the ethernet PoE. In an embodiment, the connection terminal 114 may then be reconfigured to act as an I/O channel and route such I/O signals using either bidirectional electrical switches, mechanical relays, or the like.

If no voltage is detected at the ethernet PoE port and a voltage is detected on the connection terminal 114, the electrical transmitter 100 may then configure the connection terminal 114 to act as a power terminal.

During operation, should the connection terminal 114 be configured to act as an I/O channel, the electrical transmitter 100 would likely sense an electrical signal on the connection terminal 114 despite being used as an I/O channel. In this case, although a signal is detected, the electrical transmitter 100 would still utilize the power from the PoE terminals as the power source. In an embodiment, a predetermined signal threshold must be reached at the connection terminal 114 for it to be deemed as power supplied for use as the sole power source. The signal and related threshold may be a voltage, current, and/or duration of electrical signal. In an embodiment, when PoE is detected, the electrical transmitter 100 defaults to using the PoE as the power source, effectively ignoring voltages at the connection terminal 114.

In embodiments, if PoE is detected and power is detected at the connection terminal 114 (or exceeds the predetermined signal threshold) simultaneously, a notification may be generated. The electrical transmitter 100 may generate a visual, textual, and/or audible notification. The electrical transmitter 100 may isolate the power detected on the connection terminal 114 to prevent damage due to wiring faults and the like.

In embodiments, current limiting circuits and protection circuits may be employed in case power is applied to the connection terminal 114 being configured to act as an I/O channel.

In an embodiment, the electrical transmitter 100 is manually configurable to receive power from either the ethernet connection 118 or the connection terminal 114.

The present description depicts specific examples to teach those skilled in the art how to make and use the best mode of the invention. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

What is claimed is:

1. An electrical transmitter (100) comprising:
   an ethernet connection (118);
   a power source;
   electronics (112) configured to receive the ethernet connection (118) and the power source;
   wherein the electronics (112) comprise logic operable to detect the power source and accept power from either the ethernet connection (118) or a dedicated power connection (116);
   a remappable power connection terminal (114) with the electronics (112) operable to accept power when the dedicated power connection (116) is detected, and operable to accept a non-power connection when power from the ethernet connection (118) is detected.

2. The electrical transmitter (100) of claim 1, wherein the non-power connection comprises an analog I/O channel.

3. The electrical transmitter (100) of claim 1, wherein the electronics (112) comprises logic operable to automatically map the power connection terminal (114) to be the non-power connection when power is detected from the ethernet connection (118).

4. The electrical transmitter (100) of claim 1, wherein the electronics (112) is configurable to manually map the power connection terminal (114) to be the non-power connection.

5. The electrical transmitter (100) of claim 4, wherein the electronics (112) is configurable to manually map the power connection terminal (114) to be the non-power connection with software.

6. The electrical transmitter (100) of claim 4, wherein the electronics (112) is configurable to manually map the power connection terminal (114) to be the non-power connection with hardware.

7. The electrical transmitter (100) of claim 1, wherein the electronics (112) is operable to detect an electrical signal at the connection terminal (114), and compare the electrical signal to a predetermined threshold, and wherein the predetermined threshold must be reached for the electronics (112) to use as the electrical signal at the connection terminal (114) as a sole power source.

8. A method for operating an electrical transmitter (100) comprising:
   receiving an ethernet connection (118);
   receiving a power source;
   providing electronics (112) configured to receive the ethernet connection (118) and the power source;
   detecting the power source;
   accepting power from either the ethernet connection (118) or a dedicated power connection (116);
   providing a remappable power connection terminal (114) with the electronics (112);
   accepting power from the power connection terminal (114) when the dedicated power connection (116) is detected; and
   accepting a non-power connection from the power connection terminal (114) when power from the ethernet connection (118) is detected.

9. The method for operating an electrical transmitter (100) of claim 8, wherein the non-power connection comprises an analog I/O channel.

10. The method for operating an electrical transmitter (100) of claim 8, comprising the step of automatically mapping the power connection terminal (114) to be the non-power connection when power is detected from the ethernet connection (118).

11. The method for operating an electrical transmitter (100) of claim 8, comprising the step of a manually mapping the power connection terminal (114) to be the non-power connection.

12. The method for operating an electrical transmitter (100) of claim 11, comprising the step of a manually mapping the power connection terminal (114) to be the non-power connection with software.

13. The method for operating an electrical transmitter (100) of claim 11, comprising the step of a manually mapping the power connection terminal (114) to be the non-power connection with hardware.

14. The method for operating an electrical transmitter (100) of claim 8, wherein the electronics (112) is operable to detect an electrical signal at the connection terminal (114), and compare the electrical signal to a predetermined threshold, and wherein the predetermined threshold must be reached for the electronics (112) to use as the electrical signal at the connection terminal (114) as a sole power source.

* * * * *